(12) United States Patent
Stefanoni

(10) Patent No.: US 10,188,236 B2
(45) Date of Patent: Jan. 29, 2019

(54) MACHINE FOR DISPENSING BEVERAGES

(71) Applicant: Ides Development Company Limited, Hong Kong (CN)

(72) Inventor: Roberto Stefanoni, Oggiono (IT)

(73) Assignee: IDES DEVELOPMENT COMPANY LIMITED, Hong Kong (HK)

( * ) Notice: Subject to any disclaimer, the term of this patent is extended or adjusted under 35 U.S.C. 154(b) by 0 days.

(21) Appl. No.: 15/032,504

(22) PCT Filed: Oct. 20, 2014

(86) PCT No.: PCT/IB2014/065469
§ 371 (c)(1),
(2) Date: Apr. 27, 2016

(87) PCT Pub. No.: WO2015/059621
PCT Pub. Date: Apr. 30, 2015

(65) Prior Publication Data
US 2016/0309945 A1    Oct. 27, 2016

(30) Foreign Application Priority Data
Oct. 25, 2013   (IT) .............................. RM2013A0593

(51) Int. Cl.
*A47J 31/36*    (2006.01)
*A47J 31/40*    (2006.01)

(52) U.S. Cl.
CPC ......... *A47J 31/3633* (2013.01); *A47J 31/407* (2013.01)

(58) Field of Classification Search
CPC ............................ A47J 31/3633; A47J 31/407
(Continued)

(56) References Cited

U.S. PATENT DOCUMENTS

2013/0239820 A1* 9/2013 Baldo ................. A47J 31/3633
99/295
2014/0102310 A1* 4/2014 Aardenburg ........ A47J 31/3623
99/295
(Continued)

FOREIGN PATENT DOCUMENTS

EP    1721553 A1    11/2006
EP    1859712 A1    11/2007
(Continued)

OTHER PUBLICATIONS

International Search Report and Written Opinion for International Application No. PCT/IB2014/065469 (dated Oct. 20, 2014) (12 pages).

*Primary Examiner* — Dana Ross
*Assistant Examiner* — Joe E Mills, Jr.
(74) *Attorney, Agent, or Firm* — Lucas & Mercanti, LLP

(57) ABSTRACT

An infusion group to be used in a machine for dispensing beverages extracted from capsules, which group has:
  a capsule-holder with an infusion chamber;
  an infusion head, cooperating with the capsule-holder;
  a system for the relative movement of a capsule (C) with respect to the capsule-holder;
  a capsule retaining device of the capsule during the relative motion between capsule and capsule-holder, having a first and a second vertical oblong element for retaining a capsule projecting upper edge,
  wherein the first retaining element retains the capsule while it enters the infusion chamber
  and the second retaining element retains the used capsule while it is extracted from the infusion chamber
  two control arms, determining that the relative motion between capsule and capsule-holder is carried out in a
(Continued)

coordinated manner with the relative position between capsule-holder and infusion head.

16 Claims, 6 Drawing Sheets

(58) Field of Classification Search
USPC .................................... 99/295, 302 P, 289 R
See application file for complete search history.

(56) References Cited

U.S. PATENT DOCUMENTS

| | | | |
|---|---|---|---|
| 2014/0130680 A1* | 5/2014 | Fin .................. | A47J 31/3633 99/295 |
| 2014/0178546 A1* | 6/2014 | Besson .............. | A47J 31/3628 426/425 |
| 2014/0255573 A1* | 9/2014 | Larzul ............... | A47J 31/3633 426/433 |
| 2014/0314926 A1* | 10/2014 | Hanes ................ | A47J 31/462 426/431 |
| 2014/0348994 A1* | 11/2014 | Deuber .............. | A47J 31/3633 426/425 |
| 2015/0125586 A1* | 5/2015 | Ergican ............. | A47J 31/46 426/590 |
| 2015/0150407 A1* | 6/2015 | Bugnano ........... | A47J 31/3638 426/431 |
| 2015/0173559 A1* | 6/2015 | Rotta ................. | A47J 31/3628 426/431 |
| 2015/0223630 A1* | 8/2015 | Reimondo ......... | A47J 31/3633 426/425 |

FOREIGN PATENT DOCUMENTS

| | | |
|---|---|---|
| EP | 2368466 A1 | 9/2011 |
| WO | 2008014830 A1 | 2/2008 |
| WO | 2009/084059 A1 | 7/2009 |

* cited by examiner

MACHINE FOR DISPENSING BEVERAGES

CROSS-REFERENCE TO RELATED APPLICATIONS

This application is a 371 of PCT/IB2014/065469, filed Oct. 20, 2014, which claims the benefit of Italian Patent Application No. RM2013A000593, filed Oct. 25, 2013.

FIELD OF THE INVENTION

The present invention relates to an infusion group to be used in a machine for dispensing beverages in form of infuse extracted from a capsule or disposable pod, in particular coffee, tea, herbal teas and the like.

BACKGROUND OF THE INVENTION

Several models of machine for the extemporaneous preparation of hot beverages in form of infuse, for example coffee, tea, herbal teas and the like, starting from a capsule or pod are known and widespread. The subject machines are used in the working environments, in the public places in general and, for few years, even in the domestic field.

The used—generally disposable or single-dose—pods or capsules indeed contain a product in granular or particle form. The final beverage is obtained by means of a process of so-called "extraction", which is constituted in making the pod or capsule to be passed through by a liquid with high temperature, typically water. The liquid, downwards of such "infusion" through the pod or capsule, implements the beverage which is dispensed to the consumer.

Such extracting and dispensing process is implemented in a dedicated group of the machine, called indeed infusion group. The latter typically comprises a capsule-holding body and an infusion head bearing the ducts and the mechanisms for feeding the liquid which has to cross the capsule received in the capsule-holding body. The infusion group has to be able of:

receiving the typically disposable capsule,
performing the real infusion phase,
ejecting or allowing the ejection of the used capsule, and
arranging to receive a new capsule.

Such sequence of procedures typically is performed in automatic way, through controlled mechanisms to determine a relative motion between infusion head and capsule-holding body coordinated with the above-mentioned phases of inserting the capsule, infusion and ejection of the capsule itself.

In several of the known machines, the relative motion between infusion head ad capsule-holding body is of translatory type and it is performed according to a longitudinal direction of the infusion group, allowing a selective approaching and departing therebetween.

However, the known configurations use generally complex mechanisms to implement in a coordinated way the motions of the infusion head, of the capsule-holder and of the capsule itself, with important mechanical stresses and working strokes at the expense of the several components, to the detriment of the overall reliability of the system.

On the other side, said mechanisms have to guarantee optimum sealing and infusing conditions to guarantee the quality of the end beverage.

SUMMARY OF THE INVENTION

Based upon what illustrated in the preceding section, the technical problem placed and solved by the present invention is to provide an infusion group to be used in a machine for dispensing beverages starting from a disposable capsule or pod allowing to obviate the drawbacks mentioned above with reference to the known art.

Such problem is solved by a device for guiding the capsule according to claim 1 and by an infusion group including it.

Preferred features of the present invention are subject of the depending claims.

In the present context, the term "capsule" is to be meant in its widest meaning to include pods or any disposable or multi-use receptacle or particle infusion portion.

The infusion group of the invention obtains an optimum motion for inserting and extracting the capsule by means of a simple and extremely reliable guiding mechanism. It allows reducing the time necessary to insert and eject the capsule and therefore on the whole the time between subsequent dispensing procedures. At the same time, the infusion conditions, in particular as far as the seal and the pressure exerted on the capsule are concerned, result to be optimum.

In a particularly preferred embodiment, it is provided that the capsule and the capsule-holder have mutual coupling, or engagement, means, suitable to determine, by engaging, a relative motion ending in a predetermined position of the capsule in the capsule-holder. During the engagement, a relative rotation between capsule and capsule-holder can be induced.

The presence of such means can even prevent capsules different from those therefor it has been designed from being inserted in the capsule-holder.

Preferably, the above-mentioned mutual engagement means comprises or are constituted by one or more positive connection means, preferably implemented like one or more teeth or projections obtained on the capsule and one or more corresponding seats or recesses obtained on the walls of the infusion chamber defined within the capsule-holder, and/or viceversa. In this way, as said above during the relative motion that carries the capsule in the capsule-holder said elements engage and guide the two components to assume a univocally defined, or however predetermined, infusion position.

Preferably, the engagement means comprises one or more tilted, in particular plane, profiles, mutually engageable and obtained on the capsule-holder and on the capsule.

It will be understood that, thanks to such coupling or engagement means, an exact or univocal positioning of the capsule by the user or the machine is not required, as indeed the engagement means, in particular the just mentioned tilted profiles or equivalent means, makes the capsule to rotate as far as the predetermined position.

Other advantages, features and use modes of the present invention will result evident from the following detailed description of some embodiments, shown by way of example and not for limitative purpose.

BRIEF DESCRIPTION OF THE FIGURES

The figures of the enclosed drawings will be referred to, wherein.

DETAILED DESCRIPTION OF PREFERRED EMBODIMENTS

Figure 4:
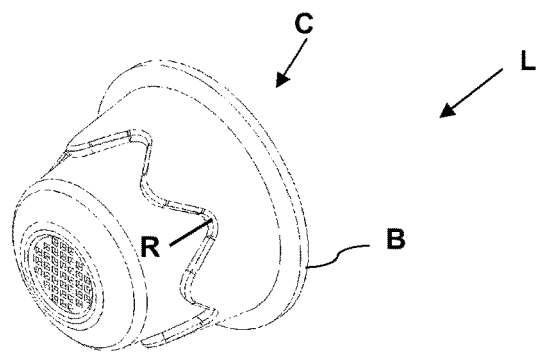
FIG. 4 shows a perspective view of a capsule to be used with the devices and the machine of the preceding figures.

The above-illustrated figures show portions of a machine for dispensing infused beverages extracted from disposable capsules, in particular for example coffee, tea, herbal teas and the like and, in FIG. 4, an example of single-dose and disposable capsule apt to be used in such machine.

Figure 2A:
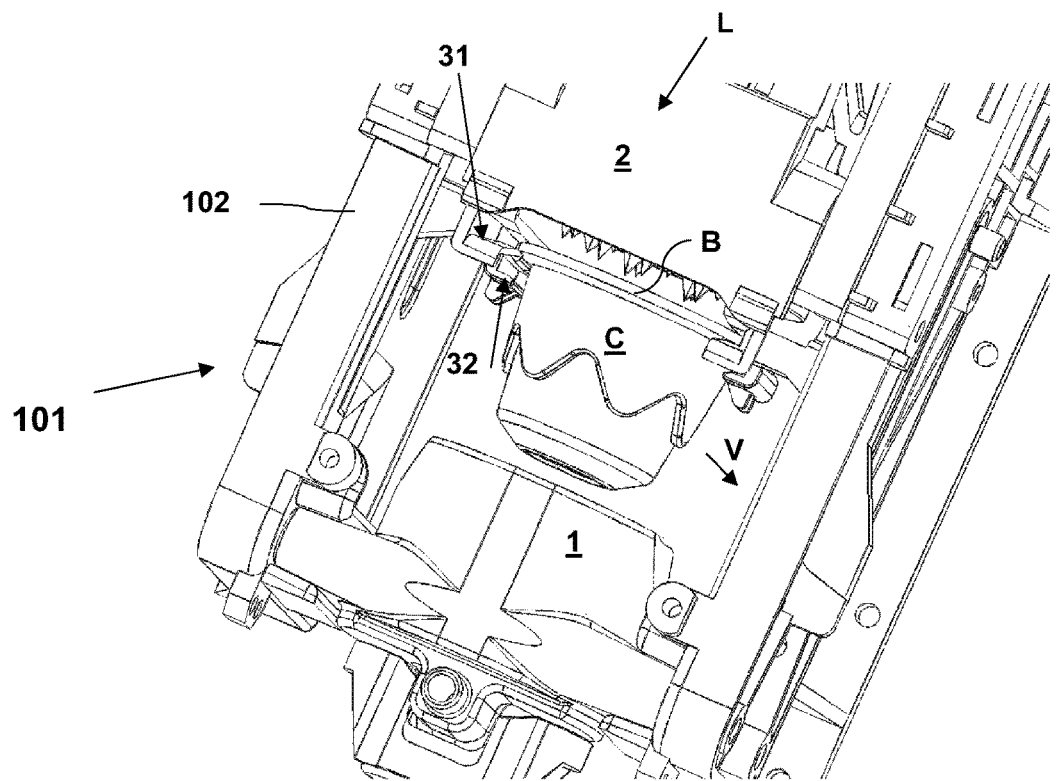
FIGS. 2A, 2B and 2C show two perspective views and a top plan view, respectively, of a portion of a machine for dispensing beverages extracted from disposable capsules incorporating the devices of FIG. 1, in a configuration wherein a new capsule has just been inserted.

By firstly referring to FIG. 2A, the above-illustrated machine mainly comprises: a capsule-holder 1; an infusion head 2 apt to cooperated with the capsule-holder 1 for the extraction of the beverage; and moving means for the relative motion of the infusion head 2 and of the capsule-holder 1. The capsule-holder 1, the infusion head 2 and the just illustrated moving means can be considered a portion of an infusion group 101 of the machine.

The above-mentioned moving means are suitable to determine a relative translational motion in a direction L of approaching/departing of the infusion head 2 to/from the capsule-holder 1. In the present example, the capsule-holder 1 is stationary and the infusion head 2 moves in a direction L, the latter preferably horizontal.

Such direction L even corresponds to that dispensing the infusion liquid and for this reason it can be defined even direction of infusion. Preferably, it also corresponds to a longitudinal direction, possibly of symmetry, of the infusion group 101.

For sake of simplicity, hereinafter "proximal" will designate each element nearest to the infusion head 2 along such direction L and "distal" will designate each element indeed farest from such head 2.

In the present example, the above-mentioned moving means even allow a relative shifting, still in direction L, of the capsule C with respect to the capsule-holder 1, allowing in particular the selective approaching/departing of the first one to/from the second one, and this by means of a pair of guiding devices which will be described shortly.

The infusion group 101 even comprises a frame 102 which receives the capsule-holder 1 and the infusion head 2, the latter, as said, selectively mobile with respect to the frame 102 and to the capsule-holder 1 itself and apt to cooperate with the latter for the extraction of the beverage.

Figure 3A:
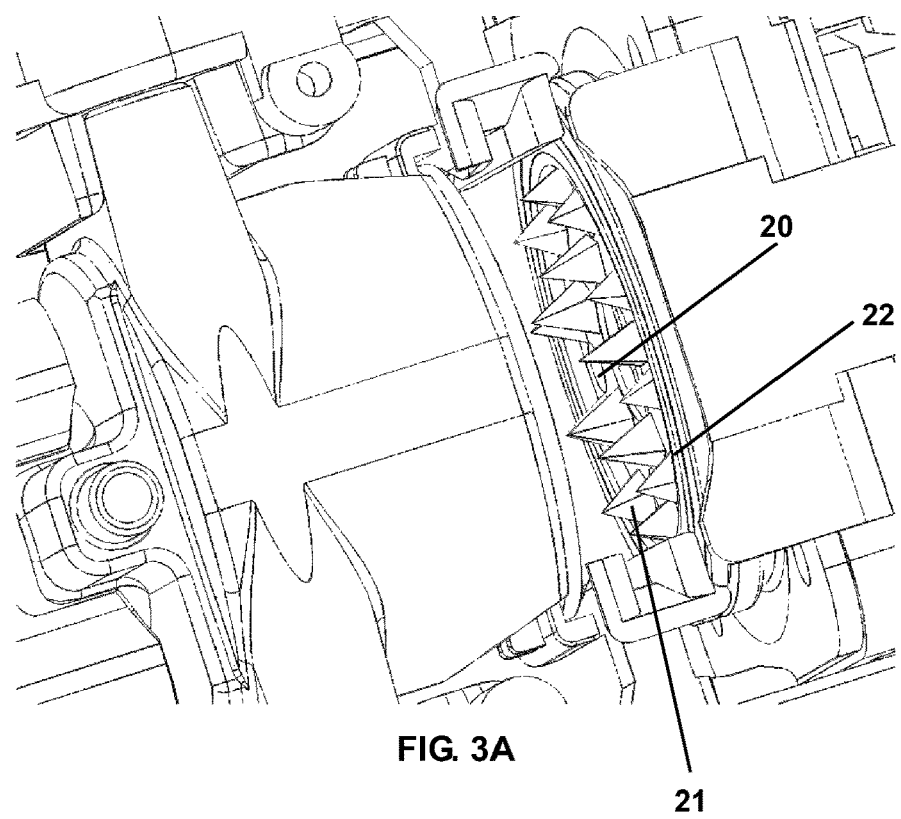
FIGS. 3A to 3C show two perspective views and a top plan view, respectively, of a portion of the above-mentioned machine in a phase wherein, once ended the infusion, an ending edge of the capsule is hooked to the purpose of extracting the capsule itself from a capsule-holder.

By referring to FIG. 3A, the infusion head 2 bears one or more dispensing nozzles or channels 20 of an extraction fluid, typically water (one of such channels is partially visible in the above-mentioned figure). The head 2 is further in communication with relative fluid-feeding means at least partially external to the frame 102. Since the latter components are well known for a person skilled in the art on themselves, one will not further dwell upon the description thereof.

The head 2 bears a plurality of boring teeth of the capsule, one thereof designated by way of example with 21. A sealing, preferably round gasket 22 is further provided, arranged like a crown or a ring around the boring teeth 21. The gasket 22 is mounted integral to such teeth 21 and fastened to a generally larger inner proximal gasket (the latter not visible in the figures). The overall configuration, known on itself, is so that, at the beginning of the infusion, such more internal gasket deforms in a predetermined way in direction L due to the effect of the pressure induced by a pump feeding the dispensing channels 20. In this way, such inner gasket makes the gasket 22 and the teeth 21 to perform a calibrated distal shifting with respect to the remaining portion of the infusion head 2 guaranteeing the optimum perforation of the capsule and the sealing of the gasket 22 itself.

The infusion head 2 further bears a pair of engagement tab elements 24, arranged bilaterally thereon and visible for example in FIGS. 2B and 2C, the function thereof will be explained hereinafter. Preferably, such engagement tab elements are shaped like a post or pin.

To the head 2 even contrast elastic means—not represented in the figures—can be associated, arranged in several places and apt to connect the head 2 itself to the frame 102. Since even such arrangement of elastic means is known on itself, one will not further dwell upon the relative description.

Figure 5A:
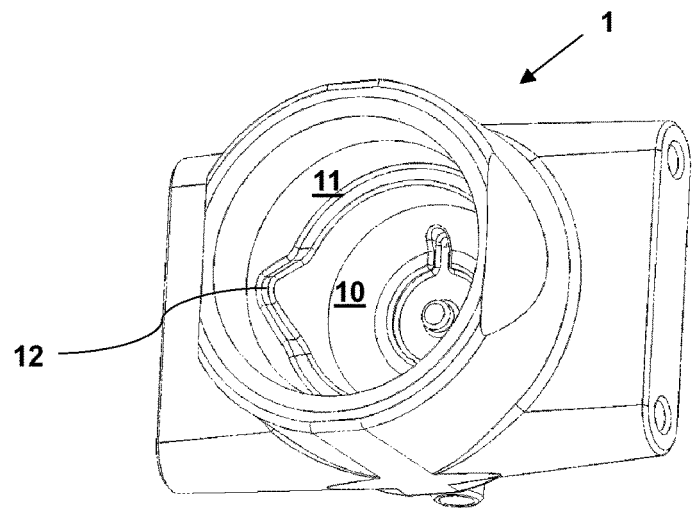
FIGS. 5A and 5B show a perspective view and a view in longitudinal section, respectively, of a preferred embodiment of a capsule-holder of the machine of the preceding figures.
Figure 5B:
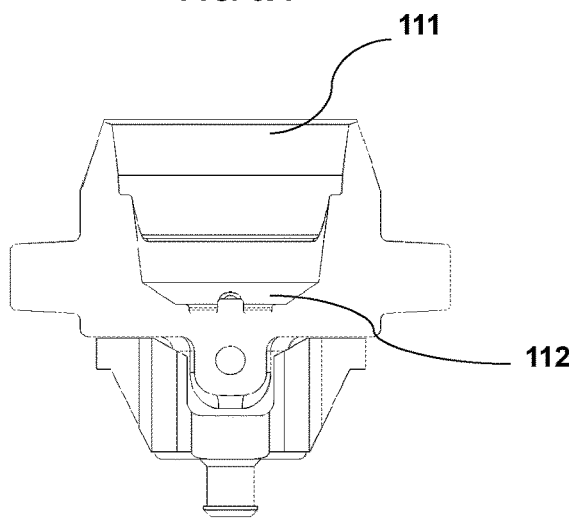

A preferred embodiment of the capsule-holder 1 is shown in FIGS. 5A and 5B.

The capsule-holder 1 defines an infusion chamber 10 suitable to receive the capsule indeed during the infusion and which thus implements a seat or receptacle for the capsule itself. The infusion chamber 10 substantially is shaped like a cup or however it has a suitable convex shape.

In the present example, the chamber 10 and the capsule-holder 1 have a substantially circular geometry. Still in the present example, the chamber 10 has a tapered, in particular substantially truncated conical shape, with larger base 111 arranged at the inlet of the infusion liquid, that is proximally, and smaller base 112 arranged on the opposite side, that is at the side dispensing the beverage and thus distally.

In the herein considered example, the capsule-holder 1, at its own wall or side skirt 11 delimiting the infusion chamber 10, has a shaped projection, or tooth, 12 apt to engage a recess R of the capsule C shown in FIG. 4. The tooth 12 implements engagement means of the capsule C apt to determine a predetermined, in case univocal positioning, of the capsule itself within the capsule-holder 1.

In particular, at the beginning of the insertion of the capsule C within the capsule-holder 1, the tooth 12 starts the engagement with a recess R of the capsule, by inducing the latter to rotate to implement a complete engagement of the tooth 12 in the recess R. In the herein considered example, the capsule C has a plurality of shaped recesses R, preferably six. The relative sizing between capsule and capsule-holder is so that, in any initial orientation of the capsule upon the insertion in the capsule-holder, there is a recess R engaging at least partially the tooth 12.

Both for the capsule C and for the capsule-holder 1 the position of the recesses R or of the tooth 12 determines even a variation in the cross section, and in particular a reduction thereof in the direction of infusion L, as already mentioned above.

Embodiment variants can provide mutual engagement means between capsule-holder and capsule different from those considered herein, and in particular an inverted position of the number and type of projections and recesses between capsule and capsule-holder.

In general terms, the coupling between capsule and capsule-holder which brings the first one to rotate with respect to the second one substantially according to an axis parallel to L is based upon the engagement of respective tilted profiles or planes.

In the present embodiment the capsule C further has a projecting upper edge B suitable to allow to retain the capsule during the insertion and extraction phases, as it will be described in details hereinafter.

For the mutual engagement means of the capsule-holder and/or of the capsule as sofar described and as defined in the claims, a separate protection could be requested, independently from the features of the machine and from the presence of the guiding devices(s), and in particular even independently from the features of the independent claim 1.

Figure 1:
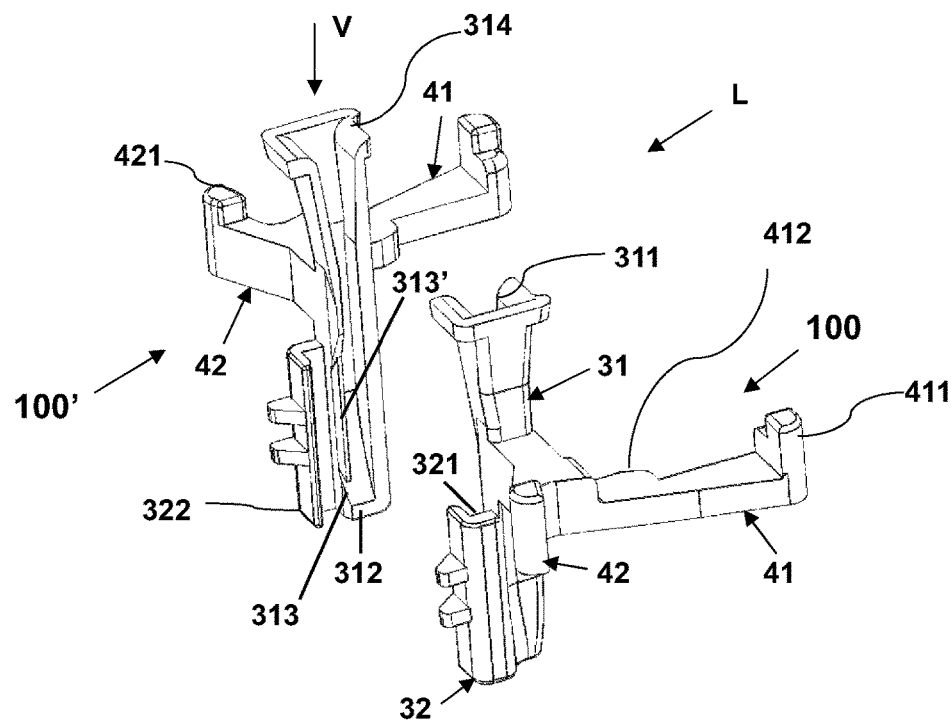
FIG. 1 shows a perspective view of a pair of guiding devices of a capsule according to a preferred embodiment of the present invention.

According to the invention—and with reference to FIG. 1—the infusion group 101 further comprises at least a guiding device of a capsule C for inserting and extracting the latter into/from the capsule-holder 1.

In the present embodiment, two guiding devices are advantageously provided, both represented in FIG. 1 and herein designated with 100 and 100'. The latter preferably are identical and arranged bilaterally with respect to the direction of infusion L. Hereinafter, for sake of simplicity, only the device 100 will be described and it will be referred to, the same description for the device 100' being valid.

Preferably, the device 100 is in form of a monolithic body, in case implemented as one piece.

The device 100 first of all comprises means for retaining the capsule during a relative motion between the latter and the capsule-holder 1.

Such retaining means in turn comprises a first retaining guide element 31 and a second retaining guide element 32 of the edge B of the capsule C. As shown in FIG. 1, each one of the elements 31 and 32 is configured like a guide or channel, wherein preferably the edge B of the capsule (shown in FIG. 2A) is retained between two substantially parallel walls. In particular, each element 31, 32, bears a longitudinal seat, respectively 311 and 321, extending in a direction V of engagement of the edge B of the capsule. Such direction V is substantially orthogonal to the of infusion L and, in the present example, substantially vertical for both the elements 31 and 32.

As it will be explained hereinafter by referring to the operating modes of the infusion group 101, the first retaining element 31 is apt to retain the capsule during a relative motion that carries the capsule to be infused to enter the infusion chamber 10, whereas the second retaining element 32 is configured so as to retain the capsule during a relative motion of extracting the used capsule from the infusion chamber 10, by allowing the ejection thereof by gravity from the group 101.

In the present embodiment, the first retaining element 31 is configured in form of guide extending along the engagement direction V and bears terminal stop means 312 (visible in FIG. 1 only for the device 100'). In particular, the configuration of the first element 31 is so that the edge B of the capsule engages the seat 311, slide within it according to the direction V and abuts on the terminal stop means 312. Preferably, the latter is constituted in an edge arranged substantially orthogonal to the engagement direction V.

At its own longitudinal end opposite to the edge 312, the first element 31 comprises an invitation to the insertion 314.

Preferably, the first retaining element 31, at or near the terminal stop means 312, has a profile or lateral seat 313 substantially shaped like a squared "C" or a jaw, and in general with a shape allowing the release of the edge B when the element 31 is moved in a direction of departing from the capsule. Upwardly such seat 313, that is in a distal direction with respect to the abutment edge 312, the retaining element 31 bears a recess 313', preferably with arcuate and in particular circular profile. Such recess 313' extends in cross direction, that is substantially orthogonal both to the direction of infusion L and to the engagement direction V. It defines a communication between the seats or channels 311 and 321.

As it will be evident from the description of the operating modes illustrated hereinafter, the recess 313' allows an easy release of the capsule from the channel 311 in the capsule-holder 1 and it favours, in a subsequent phase after the infusion, to hook the capsule by the second retaining element 32. In particular, the configuration of the recess 313' allows avoiding interferences of the guiding device 100 with the capsule-holder 1 in said phases of insertion and extraction into/from the capsule-holder 1.

The second retaining element 32 is configured in a shape substantially like a "L" or "C". In particular, it bears an engagement edge or flange 322 (better visible in FIG. 1 for the device 100'), and in general a hooking element, suitable to "hook" and, in the present example, to drag the edge B of the capsule to allow the disengagement thereof from the capsule-holder 1 and a subsequent fall by gravity outside the infusion group 101.

As already said, the first and the second element 31 and 32 has an oblong shape and extend according to the engagement direction V, which is indeed the direction of prevailing extension. The first element 31 is longer than the second element 32 along such direction to allow the insertion and guide of a "fresh" capsule in the position abutted onto the edge 312. The second element 32, indeed, is shorter and it extends parallelly to the first element 31 at the ending portion thereof, even to not interfere with other mechanisms of the infusion group 101, and in particular with the infusion head 2.

The device 100 further comprises a pair of arms 41 and 42, which define mechanical control means apt to determine that the relative motion between capsule C and capsule-holder 1 is performed in coordinated way with the relative position between capsule-holder 1 and infusion head 2. The guiding device 100 that carries the capsule, generally, is released from the infusion head 2; however, through such mechanical control means the device can be induced to move integrally to the head 2 in selected phases of an infusion cycle, as it will be illustrated in more details shortly.

Figure 2B:
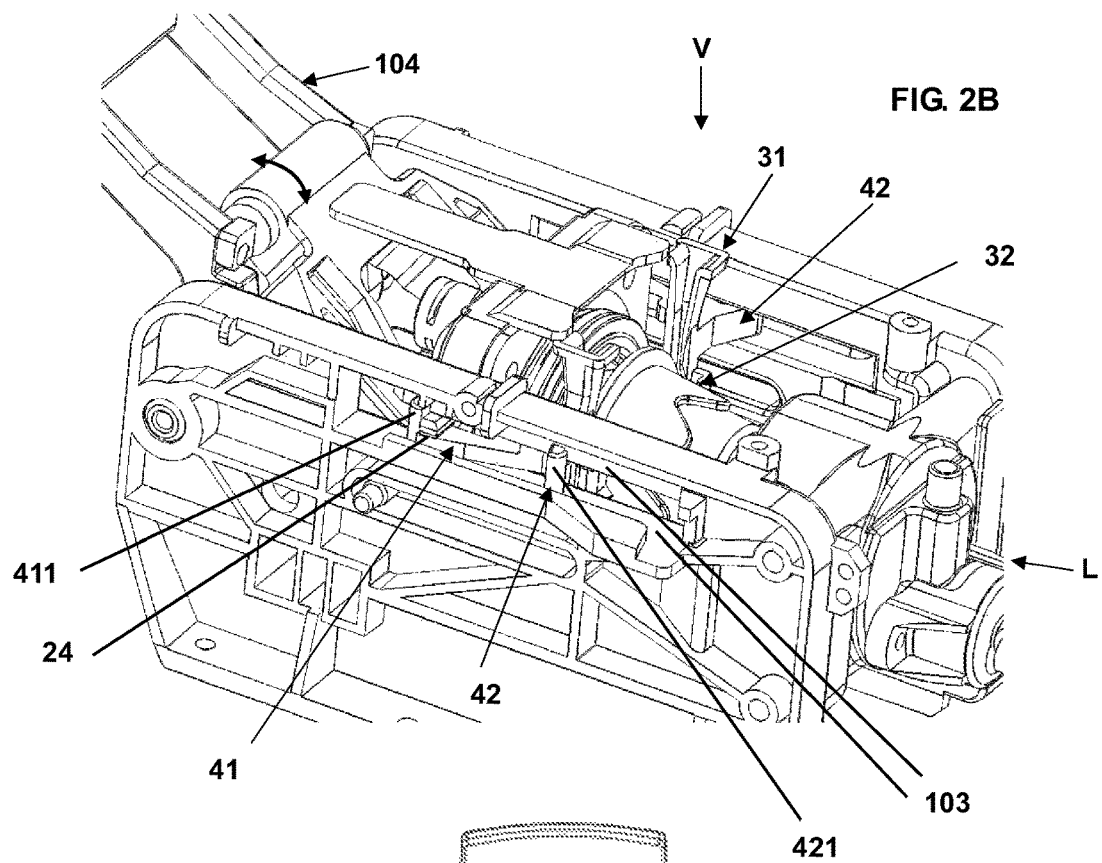
Figure 2C:
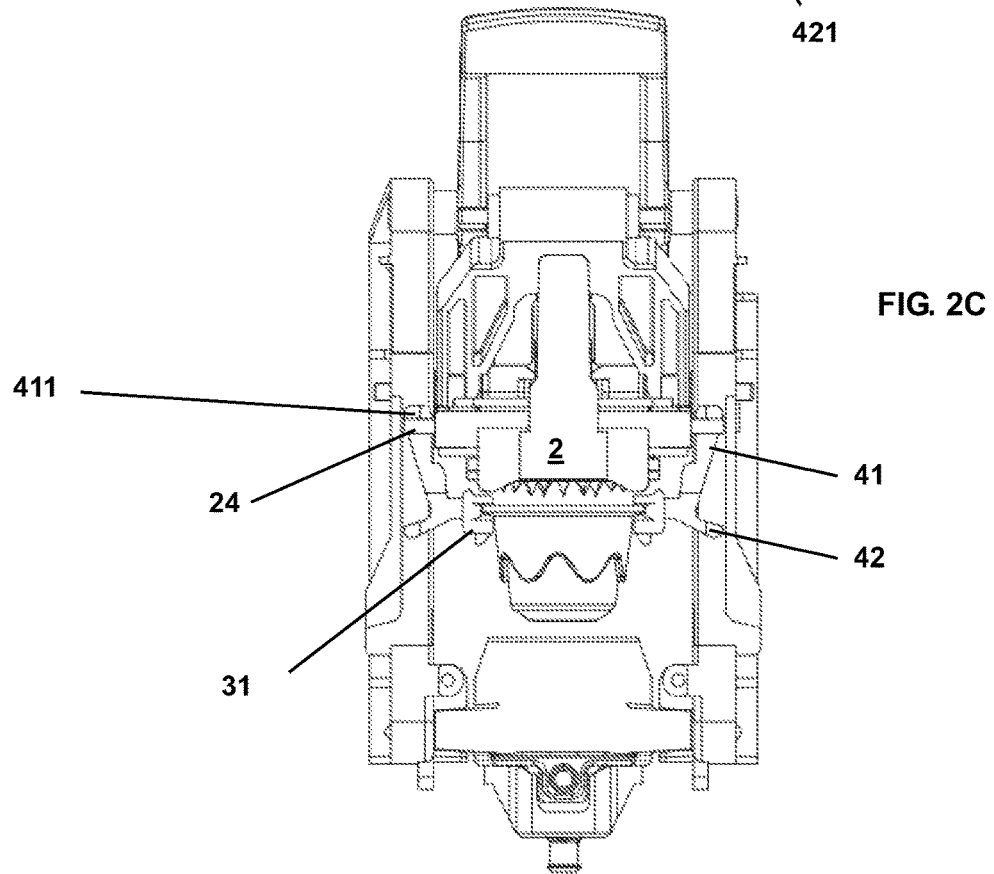

By also referring to FIGS. 2B and 2C, each arm 41, 42 is configured to engage a corresponding seat or guide 103 obtained in the frame 102 of the infusion group 101. In particular, in the present embodiment the terminal end of the arm 42 distal with respect to the retaining elements 31 and 32 bears an engagement element 421, suitable to be slidingly coupled and/or guided in the seat or guide 103 on the frame 102.

The arm 41 bears too, at the terminal distal end with respect to the retaining elements 31 and 32, an engagement profile element 411 as shown in FIG. 1. Such engagement profile element 411 of the arm 41 is apt to interact with a respective engagement tab element 24 of the head 2 as shown in FIGS. 2B and 2C. In particular, as it will be illustrated hereinafter by referring to the operating modes of the machine, the coupling between elements 411 and 24 is so as to allow a selective dragging in translation of the devices 100 and 100' by the head 2 during a return stroke after infusion.

As shown in FIG. 1, first arm 41 further bears, in an intermediate position, a cam engagement profile 412, or equivalent means, suitable to establish a positive connection with a respective engagement tab element 24 of the infusion head 2. Still as it will be illustrated hereinafter by referring to the operating modes of the machine, such connection is so that the head 2 can induce each one of the devices 101 and 101' to rotate around an axis substantially parallel to the direction V and arranged at engagement profile 412, so as to approach/depart selectively the retaining elements 31 and 32 to/from the capsule.

Based upon what sofar illustrated, the devices 100 and 100' are then mounted on the machine, and in particular on the frame 102, so that they can slide, as said above, along the direction L and they can further rotate around respective axes substantially parallel to the direction V and substantially localized at the profiles 412. Preferably, at such axes contrast means is provided suitable to brink the devices 100 and 100' back into the not rotated position shown in the herein considered FIGS. 2B and 2C.

As shown in FIG. 1, arms 41 and 42 extend according to mutually (i.e., different) angled directions. In the embodiment shown in FIG. 1, the direction of extension for arms 41 and 42 is at a substantially orthogonal angle relative to each other.

The operating modes of the machine are illustrated hereinafter, starting from a configuration wherein a "fresh" capsule has just been inserted into the machine itself, as shown in FIGS. 2A to 2C.

The machine of the present example provides a lever or actuating arm 104 associated to a knuckle mechanism. The lever 104 is actuated in rotation (as designated schematically by the double arrow in FIG. 2B) so as to make accessible the infusion group 101, and in particular the first retaining elements 31 of the devices 100 and 100'. The edge B of the capsule C can be then inserted in such elements 31 according to the engagement direction V, until abutting onto the edges 312.

In such configuration of the machine, the infusion head 2 is in a retracted position, spaced apart from the capsule-holder 1.

Once inserted the capsule, the actuating lever 104 is rotated again to close back onto the frame 102. Such motion of the lever 104, directly or by means of a control unit, controls the feeding of the infusion head 2 towards the capsule-holder 1.

The actuation of the lever 104 can be manual or can be performed by means of suitable control means of the dispensing machine wherein the infusion group 101 is mounted.

Figure 2D:
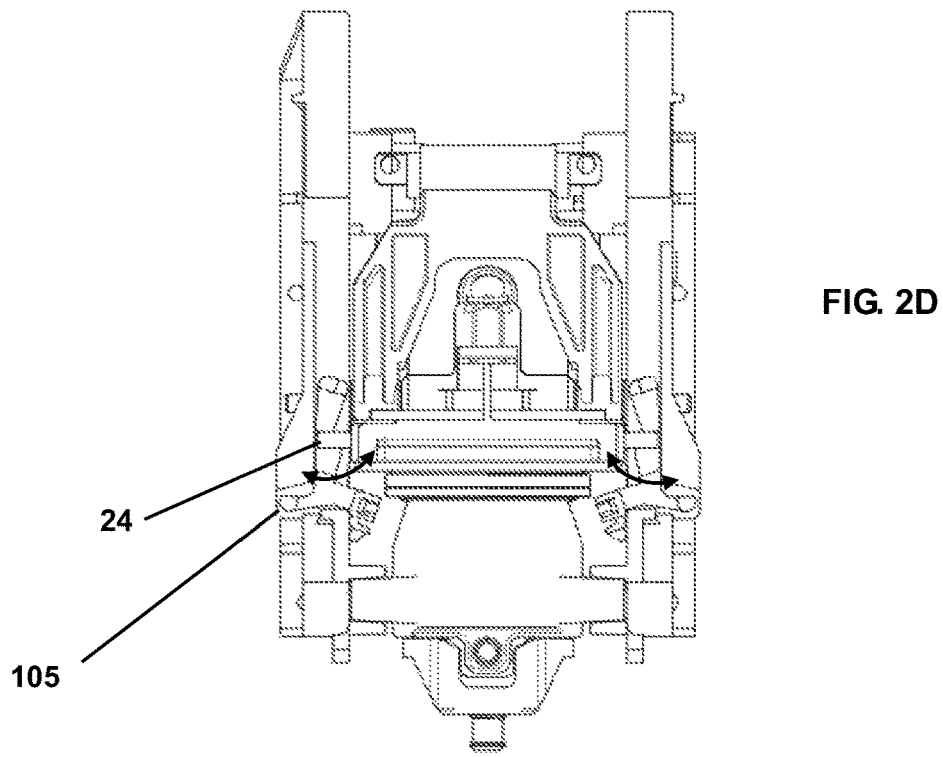
FIG. 2D shows a top plan view of a portion of the above-mentioned machine in a phase for infusing and dispensing the beverage.

As shown in FIG. 2C—even in the comparison to FIG. 2D—the overall configuration is so that, in this phase, the devices 100 and 100' do not move integrally to the infusion head 2, as the engagement elements 24 of the latter slide along the arms 41, by departing from the elements 411 along the direction L. When, in such translatory motion, the engagement elements 24 of the head 2 have met the cam profiles 412, while they continue to slide, they drag in translation the devices 100, 100'. At the same time, the coupling between elements 24 and cam profiles 412 determines a rotation motion, and in particular a divarication motion, of the devices 100 and 100' (double arrows in FIG. 2D).

Come shown in FIG. 2D, thanks to such rotation the retaining elements 31 depart from the edge B of the capsule, that is they mutually depart in a substantially horizontal direction, substantially orthogonal to the direction of infusion L. In such rotation, the second arms 42 are housed in a cavity 105 of the frame 102 of the machine. The recesses 313' favour the release of the capsule from the seats 311 into the capsule-holder 1.

The retaining elements 31 wholly release the edge B of the capsule at an infusion position wherein the capsule C is inserted in the infusion chamber 10 of the capsule-holder 1 according to the modes already described above. The overall configuration is so that at this point the infusion head 2 is in abutment on the larger base 101 of the capsule-holder 1.

At this point, the infusion head 2 adds hot liquid within the capsule C, performing the phase of extracting the beverage.

The above-mentioned configuration with double circular sealing gasket, the most external thereof designated with 22, makes that the closing of the lever 104 has not to be as strong as to guarantee the pressure tightness, since in fact it is assigned to the deformation of the above-mentioned inner gasket of the infusion head 2. Furthermore, during the pressure release (typically guaranteed by a release electric valve) there is the outlet of the inner pressure of the capsule at the circular gasket 22 with release of coffee/water in a tray for collecting used capsules, thus avoiding the very boring dripping of coffee from the dispensing nozzle in the cup, typical of all the machines nowadays on sale.

Figure 3B:
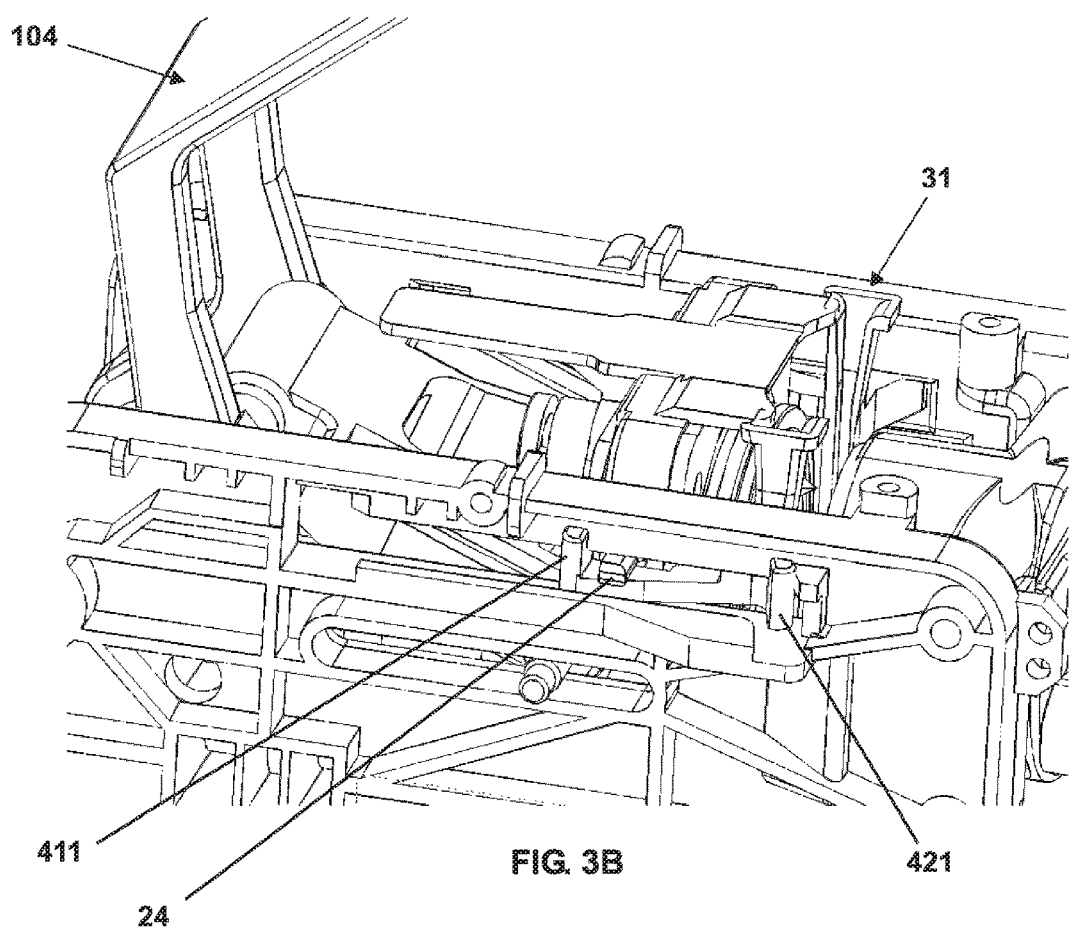
Figure 3C:
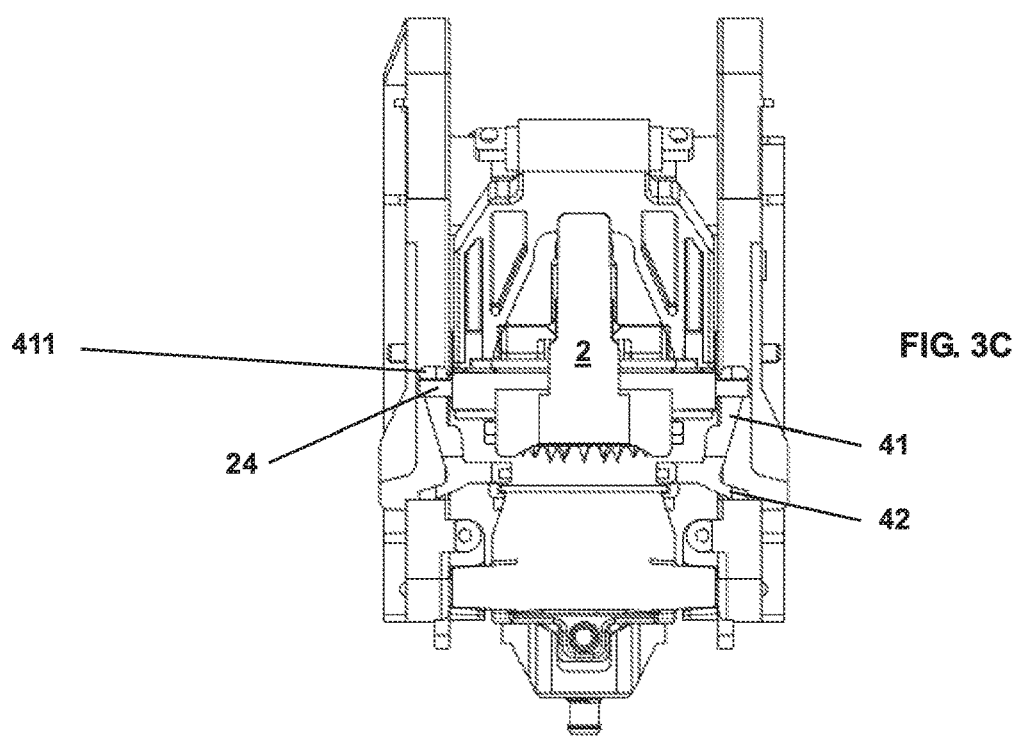

By referring to FIGS. 3A to 3C, one ended the infusion phase, the head 2 starts its own return stroke in direction L. Such return stroke can be obtained by means of the action of the above-mentioned elastic means, which connects the head 2 to the frame 102.

In the initial phase of such return stroke, the engagement elements 24 disengage the profiles 412, by allowing a rotation of the retaining elements 32 towards the edge B of the capsule. The motion of inverse rotation performed by the guiding devices 100 and 100' after the interaction of the engagement elements 24 with the cam profiles 412 is guided indeed by the shape of such profiles. It is so that, once ended the rotation, the retaining elements 31 are arranged upwardly of the edge and the elements 32 engaged thereon. The recesses 313' favour to hook the capsule in the seats 321.

Figure 3D:
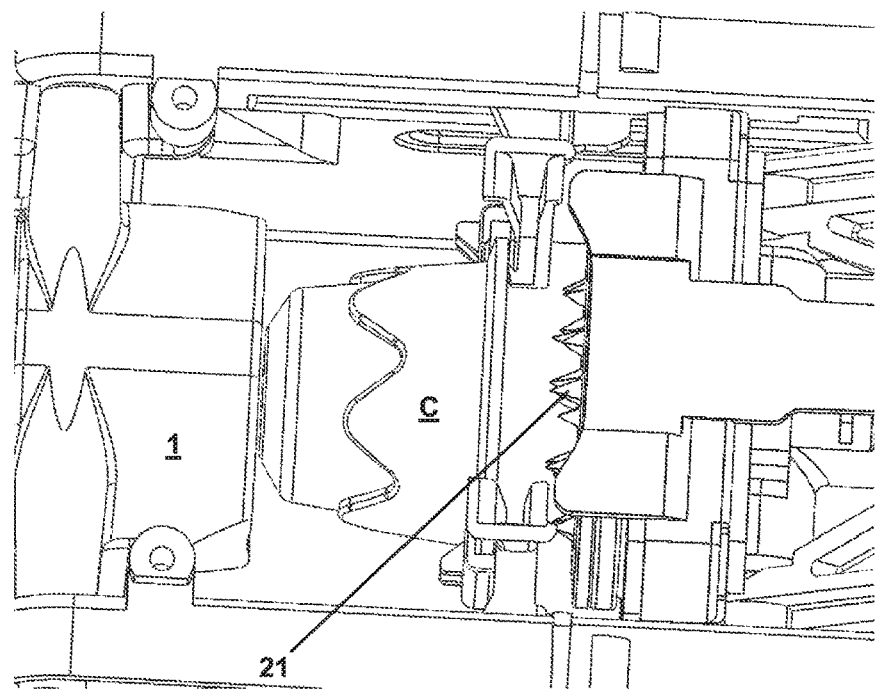
FIGS. 3D and 3E show a perspective view and a top plan view, respectively, of a portion of the above-mentioned machine in a phase immediately preceding the ejection of the capsule.
Figure 3E:
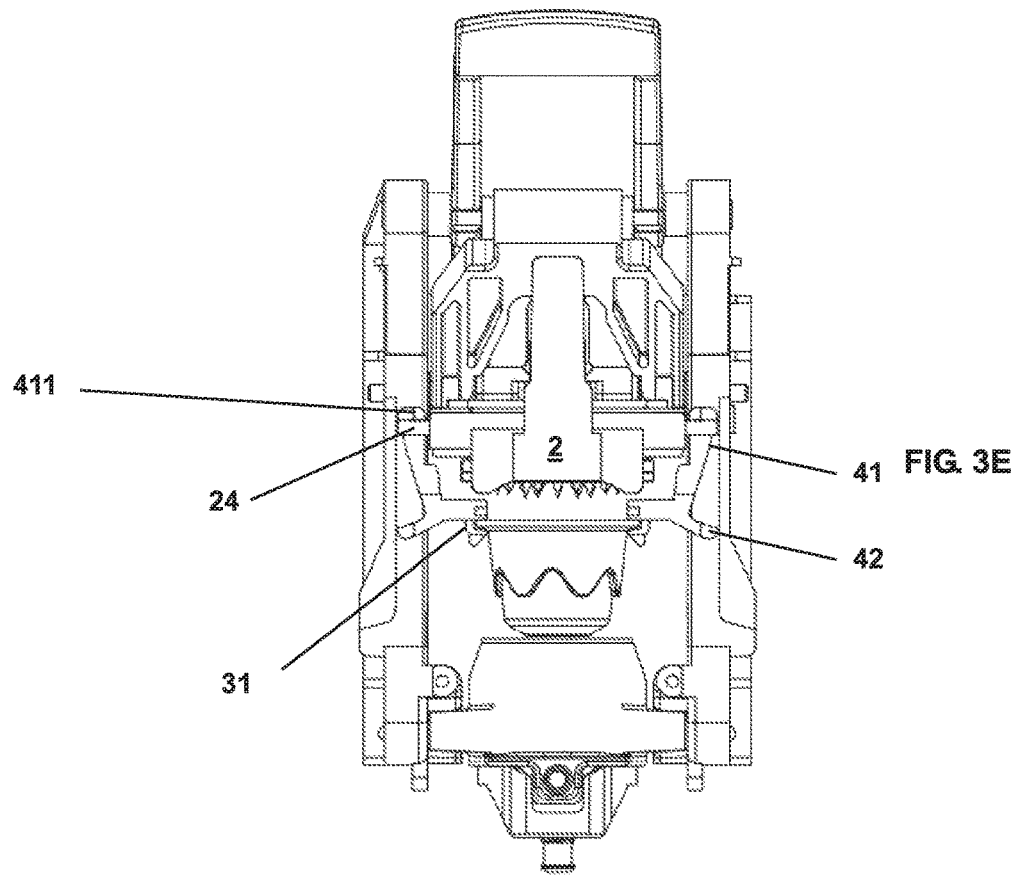

At this point, the devices 100 and 100' start again to move integrally to the head 2 as the elements 24 of the latter have brought in abutment on the elements 411. In this way, the retaining elements 32 drag the capsule C outside the capsule-holder 1. At the end of such extraction motion, thereto FIGS. 3D and 3E relate, the capsule falls by gravity outside the infusion group 101.

An embodiment variant can provide that the capsule-holder is mounted on the infusion head and moves in a coordinated way therewith and that the guiding device(s) is/are stationary and arranged at the end of the infusion stroke.

In such variant, the above-mentioned engagement means 24 could be associated to the capsule-holder.

It will be also understood that if the set of the invention is particularly suitable to be used with disposable and/or single-dose capsules, in principle it can be applied even to re-usable or multi-use and/or multi-use capsules.

The present invention has been sofar described by referring to preferred embodiments. It is to be meant that other embodiments belonging to the same inventive core may exist, as defined by the protection scope of the herebelow reported claims.

The invention claimed is:

1. A guiding device of a capsule, for use in a machine for dispensing beverages extracted from capsules, in particular coffee, tea, herbal teas and the like, which machine comprises:
   a capsule-holder which defines an infusion chamber;
   an infusion head configured to cooperate with the capsule-holder for an extraction of a beverage, said infusion head is configured with an engagement tab element;
   a lever to provide a relative movement of the capsule with respect to the capsule-holder, said lever being configured to provide a relative translational motion of the capsule with respect to the infusion chamber in a direction of infusion; and
   a frame having the capsule-holder and the infusion head disposed therein;
   the guiding device comprises:
   a retainer of the capsule during said relative translational motion, the retainer comprising at least a first retaining guide element and a second retaining guide element both for retaining a peripheral projecting edge of the capsule,
   wherein said first retaining guide element is configured with a first channel so as to retain the capsule during a relative motion that carries the capsule to be infused to enter within the infusion chamber, said first retaining guide element and said second retaining guide element being movable within the frame of the machine,
   and said second retaining guide element adjoins said first retaining guide element, and said second retaining guide element is configured with a second channel in such a way as to retain the capsule, once used, during a relative movement of extraction of the capsule from the infusion chamber and to allow capsule ejection by gravity from the machine; and
   a mechanical controller, configured to determine that the relative translational motion between the capsule and the infusion chamber is carried out in a coordinated manner with a relative position between the capsule-holder and the infusion head, wherein said mechanical controller in turn comprises:
   one or more arms extending from said first retaining guide element, each of said arms being configured to be slidingly coupled within the frame of the machine;
   an engagement profile disposed on said one or more arms, which engagement profile is configured to couple with a corresponding profile within the frame of the machine, said coupling causing, in use, a divarication of the device relative to the infusion head; and
   an engagement projecting element disposed on said one or more arms, which engagement projecting element is configured to couple with said engagement tab element of the machine so as to allow a selective dragging in translation of the device during a return stroke after infusion.

2. The guiding device according to claim 1, wherein the first channel and the second channel extend according to a direction of engagement substantially perpendicular to the direction of infusion.

3. The guiding device according to claim 1, wherein said first retaining guide element has a terminal stopper, so that the peripheral projecting edge of the capsule can engage said first guide retaining element, slide within the first channel and abut on said terminal stopper.

4. The guiding device according to claim 1, wherein said first guide retaining element has, at or near a terminal retention end, a substantially squared "C" or jaw shape, configured to release of the peripheral projecting edge of the capsule when the first retaining guide element moves away from the capsule.

5. The guiding device according to claim 1, wherein said second retaining guide element is configured substantially in the form of "L", "C" or hook, in such a way to allow the disengagement of the capsule from the capsule-holder and a subsequent fall by gravity of the capsule.

6. The guiding device according to claim 1, wherein the one or more arms is a pair of arms extending in different angled directions.

7. The guiding device according to claim 1, which is configured to be-slidably and rotatably coupled with the frame of the machine.

8. The guiding device according to claim 1, which is in the form of a monolithic body.

9. An infusion group configured for use in a machine for dispensing beverages extracted from capsules, in particular coffee, tea, herbal teas and the like, which infusion group comprises:
   a capsule-holder which defines an infusion chamber;
   an infusion head, configured to cooperate with said capsule-holder for an extraction of a beverage;
   a lever to provide a relative movement of the capsule with respect to the capsule-holder, said lever being configured to provide a relative translational motion of the capsule with respect to the infusion chamber in a direction of infusion; and
   a guiding device according to claim 1.

10. The infusion group according to claim 9, whose overall configuration is such that said direction of infusion is a substantially horizontal direction and said direction of engagement is a substantially vertical direction.

11. The infusion group according to claim 9, wherein said infusion head and said mechanical controller of said guiding device are configured in such a way to determine a moving away of said first retaining guide element with respect to the capsule at or near a position of mutual abutment of said infusion head and said capsule-holder that corresponds to an infusion phase.

12. The infusion group according to claim 9, wherein said infusion head or said capsule-holder comprise said engagement profile and said engagement projecting element of said mechanical controller of said device, the overall configuration being such that a coupling between said engagement profile and said engagement projecting element and said mechanical controller determines selectively a drag in translation or a rotation of said device.

13. The infusion group according to claim 9, wherein said capsule-holder has, at a lateral wall defining said infusion chamber, is configured to determine a predetermined positioning of the capsule within the capsule-holder by inducing a rotational motion of the capsule with respect to the capsule-holder.

14. The infusion group according to claim 13, wherein said capsule-holder includes at least a projection or tooth obtained on said lateral wall and configured to engage the capsule.

15. An infusion group configured for use in a machine for dispensing beverages extracted from capsules, in particular coffee, tea, herbal teas and the like, which infusion group comprises:

a capsule-holder which defines an infusion chamber;

an infusion head, configured to cooperate with said capsule-holder for an extraction of a beverage;

a lever to provide a relative movement of the capsule with respect to the capsule-holder, said lever being configured to provide a relative translational motion of the capsule with respect to the infusion chamber in a direction of infusion; and a guiding device according to claim 1;

wherein said capsule-holder has, at a lateral wall defining said infusion chamber, is configured to determine a predetermined positioning of the capsule within the capsule-holder by inducing a rotational motion of the capsule with respect to the capsule-holder, and wherein said capsule-holder includes at least a projection, a tooth, a seat or a recess, obtained on said lateral wall and configured to engage the capsule.

16. The guiding device according to claim 1, wherein said engagement profile is a cam-shaped.

* * * * *